United States Patent [19]

Ikegami et al.

[11] Patent Number: 4,849,990
[45] Date of Patent: Jul. 18, 1989

[54] DIGITAL COMMUNICATION SYSTEM

[75] Inventors: Fumio Ikegami, 5-7010 Yuniuji Manshion, 34-10 Kohatauchihata, Uji-shi, Kyoto; Susumu Yoshida, Kyoto; Tsutomu Takeuchi, Kyoto; Sirikiat Ariyavisitakul, Kyoto; Masaaki Sasada, Hyogo, all of Japan

[73] Assignees: Fumio Ikegami; Mitsubishi Denki Kabushiki Kaisha, both of Japan

[21] Appl. No.: 30,826

[22] PCT Filed: Sep. 13, 1985

[86] PCT No.: PCT/JP85/00513
§ 371 Date: Feb. 4, 1987
§ 102(e) Date: Feb. 4, 1987

[87] PCT Pub. No.: WO86/07514
PCT Pub. Date: Dec. 18, 1986

[30] Foreign Application Priority Data

Jun. 5, 1985 [JP] Japan .............................. 60-122022
Aug. 14, 1985 [JP] Japan .............................. 60-179884

[51] Int. Cl.$^4$ .............................................. H04B 7/02
[52] U.S. Cl. ...................................... 375/40; 375/100; 455/52

[58] Field of Search .................. 375/38, 40, 100, 102; 455/52, 65

[56] References Cited

U.S. PATENT DOCUMENTS

| | | | |
|---|---|---|---|
| 3,144,647 | 8/1964 | Sichak | 455/52 |
| 3,665,365 | 5/1972 | Bochmann | 375/40 |
| 4,384,358 | 5/1983 | Shiki et al. | 375/100 |
| 4,417,219 | 11/1983 | Brossard et al. | 375/53 |
| 4,490,830 | 12/1984 | Kai et al. | 375/40 |
| 4,715,048 | 12/1987 | Masamura | 375/100 |
| 4,726,038 | 2/1988 | Ikegami et al. | 375/53 |

Primary Examiner—Robert L. Griffin
Assistant Examiner—Marianne Huseman
Attorney, Agent, or Firm—Lowe, Price, LeBlanc, Becker & Shur

[57] ABSTRACT

The present invention provides two branches of a base station transmitter and a base station receiver, respectively, and inserts a delay circuit for ensuring a delay time difference between D and U waves required to obtain the best bit error rate for a DSK system, BPSK-RZ system, QPSK-RZ system or the like, into each system of the transmitter and the receiver, respectively, or into either the transmitter or the receiver of each system, thereby efficiently improving the bit error rate.

15 Claims, 1 Drawing Sheet

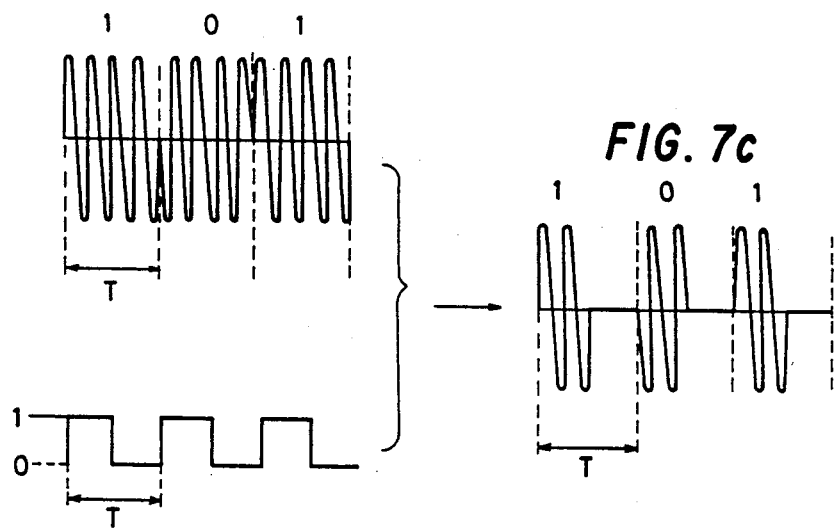
FIG. 7a
FIG. 7b
FIG. 7c
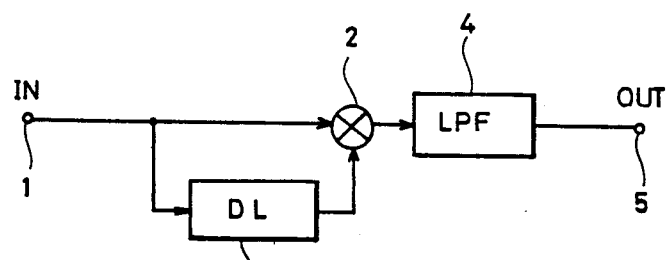
FIG. 8

FIG. 9A
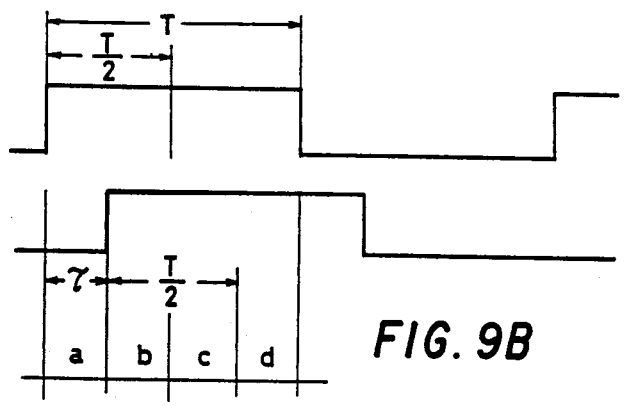
FIG. 9B
FIG. 11
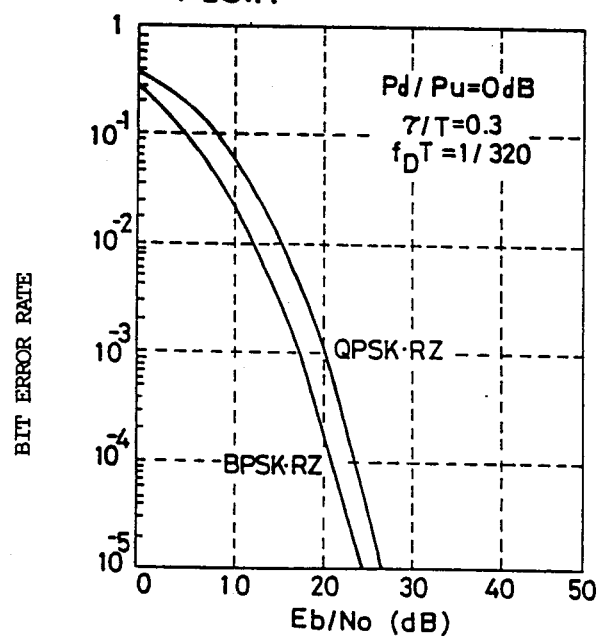

DIGITAL COMMUNICATION SYSTEM

BACKGROUND OF THE INVENTION

1. Field of the Invention

The present invention relates to a digital communication system which is resistant against multipath interference.

2. Background Art

In mobile radio communication, circuit design has been considered exceedingly difficult since the radio waves arriving through different paths deteriorate the bit error rate.

In order to solve such a problem, proposed are a double-phase shift keying system (hereinafter referred to as DSK system) and a binary-phase shift keying return-to-zero system (hereinafter referred to as BPSK-RZ system).

Description is now made on the DSK system. As shown in FIG. 3, the DSK system is so devised that it shifts carrier wave phases with respect to binary information symbols $\mp$"0" and $\mp$"1" twice by $\pi/2$ per $\frac{1}{2}$ time slot. For example, the carrier wave hases are shifted twice by $+\pi/2$ with respect to the binary information symbol $\mp$"1" and twice by $-\pi/2$ with respect to $\mp$"0", respectively.

FIG. 3(B) shows the time diagram of phase-shifted DSK signals with respect to binary information symbols "1, 0, 1" in the DSK system performing the aforementioned phase shift operation.

A demodulator employed in the DSK system is shown in FIG. 5. Received signals are divided into two, one is delayed by T/2 (T: time slot length) and the other is not delayed, which are respectively multiplied to be passed through a low-pass filter (LPF), whereby signal e(t) corresponding to the original modulated signal is obtained.

In propagation paths of a mobile radio communication system, the signal from a transmitting point arrives at a receiving point through defraction and reflection by various obstacles. Consideration is now made on two signals shown as D and U waves in FIG. 4, which are transmitted from the same point and are different by $\tau$ from each other in time received at the receiving point. It has been theoretically confirmed that a signal composed of such two signals shows such error characteristics as shown in FIG. 6(A) when demodulated by the demodulator as shown in FIG. 5.

In FIG. 6, the ordinate shows the bit error rate and the abscissa shows $\tau/T$ (T: time slot width, $\tau$: time difference between D and U waves), while symbol Eb indicates signal energy per bit, symbol $N_0$ noise power per hertz, symbol Pd/Pu average power ratio of the D wave to the U wave and symbol $f_D$ the maximum Doppler frequency. As obvious from the characteristics, the bit error rate is remarkably improved within the range of 0.1 to 0.35 of $\tau/T$.

The above description has been made on a $\pi/2$ DSK system which shifts the carrier wave phases with respect to the binary information symbols $\mp$"1" and $\mp$"0" twice by $\pi/2$ per $\frac{1}{2}$ time slot, while it has been confirmed that the said description also applies to a $\Delta\theta/2$ DSK system for shifting the carrier wave phase by $\Delta\theta/2$ ($0<\Delta\theta<\pi$) per $\frac{1}{2}$ time slot.

FIG. 6(B) shows the bit error rate of a $\pi/4$ DSK system in which the value $\pi/2$ is replaced by $\pi/4$, and as obvious from the characteristics shown in FIG. 6(B), the bit error rate is also improved within the range of 0.1 to 0.3 of $\tau/T$ in the $\tau/4$ DSK system.

The above description has been made on such case where the carrier wave phases are stepwisely shifted in the first and second halves of the time slots as shown in FIGS. 3 and 4, while the same description also applies to the case where the carrier wave phases change smoothly, e.g., to rise in raised cosine curves, for example.

As hereinabove described, the bit error rate is improved within the range of 0.1 to 0.35 or 0.1 to 0.3 of $\tau/T$ in the DSK system, and hence accurate communication is feasible through the use of such a range. However, in a general mobile communication system of a data transmission rate (smaller than several thousand bauds) employing an audio range, the delay time difference $\tau$ is so small that the value $\tau/T$ is considerably smaller than 0.1, whereby no application can be effected in regions of improved bit error rate where skillful use is made of the characteristics of the DSK system.

Description is now made on the BPSK-RZ system. BPSK-RZ signals are obtained by multiplying normal BPSK signals as shown in FIG. 7(a) by ON-OFF signals as shown in FIG. 7(b), which become $\mp$"1" in arbitrary T/2 intervals of time slots T. In other words, the BPSK-RZ signals are signals having the same amplitude and phase as that of the normal BPSK signals during the period of the first half or the second half T/2 of each time slot, and exhibiting a substantially zero carrier wave amplitude during the period of the remaining T/2.

The multiple waves of the BPSK-RZ signal are reproduced by a differential detector of FIG. 8. In FIG. 8, (1) is an IN terminal, (2) is a multiplier, (3) is a delay line having delay time of a unit time slot T, (4) is a low pass filter and (5) is an OUT terminal.

The BPSK-RZ signals received in the input terminal 1 are multipath waves formed by overlapping first BPSK-RZ signal waves (hereinafter referred to as D waves) generated by the same digital information and second BPSK-RZ signal waves (hereinafter referred to as U waves) arriving in delay by $\tau$ from the D waves. FIG. 9 illustrates time relation between the D and U waves. In FIG. 9, symbol T indicates the length of a time slot for transmitting one digital symbol of digital information. Symbol (a) indicates an interval from rise of the D waves to rise of the U waves and symbol (b) indicates an interval from the rise of the U waves to a lapse of T/2 of the D waves while symbol (c) indicates an interval from the lapse of T/2 of the D waves to a lapse of T/2 of the U waves and symbol (d) indicates an interval from the lapse of T/2 of the U waves to a lapse of T of the D waves.

Signals e(t) obtained at the output terminal 5 in the respective intervals are as follows:

With respect to $0<\tau/T<0.5$

Interval a:

$2e(t) = \begin{cases} 1 & \text{symbol: "1"} \\ -1 & \text{symbol: "0"} \end{cases}$ Interval b:

$2e(t) = \begin{cases} 1 + \rho^2 + 2\rho\cos\phi & \text{symbol: "1"} \\ -(1 + \rho^2 + 2\rho\cos\phi) & \text{symbol: "0"} \end{cases}$ Interval c:

$2e(t) = \begin{cases} \rho^2 & \text{symbol: "1"} \\ -\rho^2 & \text{symbol: "0"} \end{cases}$ -continued Interval d:
$2e(t) = 0$ With respect to $1 > \tau/T > 0.5$ Interval a:

$$2e(t) = \begin{cases} 1 - \rho^2 & \text{symbol change: "0"} \to \text{"1"} \\ 1 + \rho^2 + 2\rho\cos\phi & \text{symbol change: "1"} \to \text{"1"} \\ -(1 - \rho^2) & \text{symbol change: "1"} \to \text{"0"} \\ -(1 + \rho^2 - 2\rho\cos\phi) & \text{symbol change: "0"} \to \text{"1"} \end{cases}$$

Interval b:

$$2e(t) = \begin{cases} 1 & \text{symbol: "1"} \\ -1 & \text{symbol: "0"} \end{cases}$$

Interval c:
$e(t) = 0$

Interval d:

$$2e(t) = \begin{cases} \rho^2 & \text{symbol: "1"} \\ -\rho^2 & \text{symbol: "0"} \end{cases}$$

where $\rho$ represents the relative amplitude ratio of the U wave to the D wave and $\phi$ represents carrier wave phase difference between the D and U waves.

As obvious from the above calculation, effective outputs can be always obtained in the intervals (a) and (c) in the case of $0 < \sigma/T < 0.5$ and in the intervals (b) and (d) in the case of $1 < \tau/T < 0.5$ regardless of phase difference between the D and U waves, and hence there arise no problem such as the eye closure of the so-called eye pattern and increase in lateral fluctuation, which have been caused in the conventional BPSK modulation system.

FIGS. 10(A) and 10(B) are graphs showing characteristics of the BPSK-RZ system. FIG. 10(A) shows changes in the bit error rate with signal-to-noise ratios and FIG. 10(B) shows changes in the bit error rate with delay time difference between the D and U waves at a constant signal-to-noise ratio.

The respective items are as follows: The D and U waves are changed in Rayleigh distribution, and symbols Pd and Pu indicate average power levels of the D and U waves respectively, and symbol Eb indicates signal energy per bit while symbol No indicates noise power per unit frequency and symbol $f_D$ indicates the maximum Doppler frequency for fading.

The broken line BPSK in FIG. 10(A) shows the characteristics of the normal BPSK system for reference. As shown in FIG. 10(A), the BPSK-RZ system is very much improved in comparison with the normal BPSK system.

Further, as shown in FIG. 10(B), the bit error rate is remarkably improved within the range of 0.1 to 0.75 of $\tau/T$. Although the above description has been made on the BPSK system (bi-phase modulation), similar improvement is obtained in a QPSK system (quadri-phase modulation) in which two-bit binary information symbols $\mp$"00", $\mp$"01", $\mp$"11" and $\mp$"10" are respectively assigned to, e.g., phase changes 0, $\pi/2$, $\pi$ and $-\pi/2$ by employing a QPSK-RZ (quadri-phase shift keying return-to-zero) modulation system in which the second or first half of one time slot is zero in amplitude.

FIG. 11 is a characteristic comparison diagram between the BPSK-RZ system and the QPSK-RZ system, representing a characteristic having a similar tendency of improvement.

Although the characteristics are deteriorated when ON-OFF signals are band-restricted through a base band filter (bandwidth Bd), it has been confirmed that such deterioration of the characteristics is remarkably small as shown in FIGS. 12(A) and (B). Thus, the QPSK-RZ modulation system is sufficiently practical even if the band restriction is applied.

Such a technical idea is applicable not only to the binary information symbols but extendedly to multiphase modulation corresponding to multilevel information symbols.

In the DSK, BPSK-RZ and QPSK-RZ systems, thus, the bit error rate is improved in specific regions of $\tau/T$ (0.1 to 0.35 in the DSK system and 0.1 to 0.75 in the BPSK-RZ and QPSK-RZ systems).

However, in a general mobile radio communication system utilizing audio ranges at a data transmission rate smaller than several thousand bauds, the delay time difference $\tau$ is so small that $\tau/T$ is considerably smaller than 0.1, and hence the characteristics of the DSK and BPSK-RZ systems cannot be effectuated in the regions with the improved bit error rate.

For example, assuming that the transmission rate is 6000 bauds in low-speed data transmission by mobile radio communication and propagation time difference $\tau$ between D and U waves is 10 sec., the time slot T is as follows:

$T = 1/6000 \text{ (sec.)} = 167 \text{ }\mu\text{sec.}$

Consequently, $\tau/T = 10 \text{ }\mu\text{sec.}/167 \text{ }\mu\text{sec.} = 0.06$ whereby the value $\tau/T$ is smaller than 0.1.

DISCLOSURE OF THE INVENTION

The present invention prepares, in the transmitting and receiving systems of a base station, two branches of transmitters and receivers respectively, in one branch of which is inserted a delay circuit ensuring the delay time difference between the two branches required for the optimum operation of DSK, BPSK-RZ or QPSK-RZ system, thereby providing a digital mobile communication system for data transmission which can sufficiently effectuate the bit error rate improving characteristics of the system in the common mobile radio communication.

BRIEF DESCRIPTION OF THE DRAWINGS

FIG. 7 illustrates the BPSK-RZ system;

FIG. 8 is a diagram showing structure of a demodulator in the BPSK-RZ system;

FIG. 9 is a diagram showing two signals with delay time difference;

FIG. 11 is a characteristic comparison diagram with respect to the BPSK-RZ system and the QPSK system;

BEST MODES OF CARRYING OUT THE INVENTION

Figure 1:
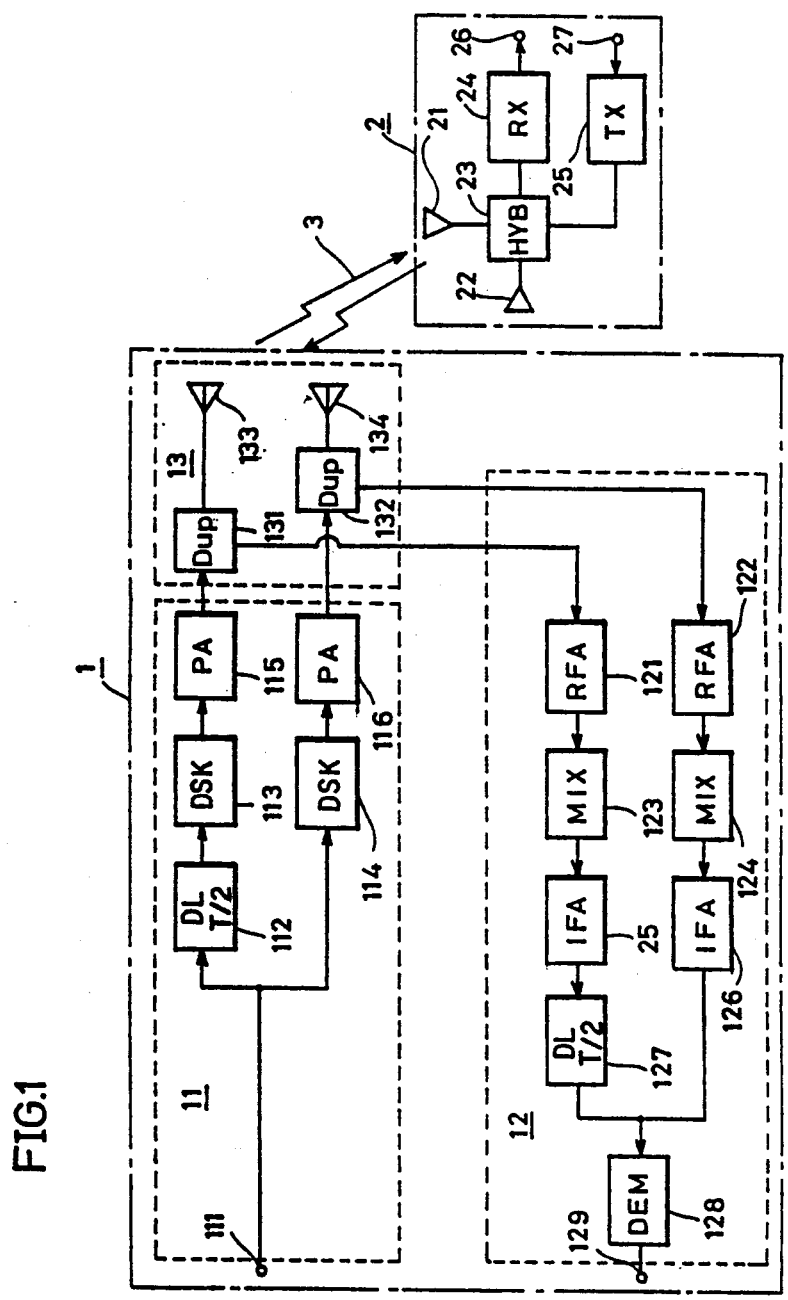
FIGS. 1 and 2 are block diagrams showing one embodiment of the present invention.

One embodiment of the present invention will be hereinafter described with reference to the drawings. Description is now made on a case where the present invention is applied to the DSK system. In FIG. 1, a base station 1 is formed by a base station transmitting system 11, a base station receiving system 12 and a base station antenna system 13. The transmitting system 11 in th base station 10 is formed by two transmitter branches. In other words, signals from a data input terminal 111 are divided into two branches. The first branch is formed by a delay circuit 112 (hereinafter referred to as DL 112), a modulator 113 (hereinafter referred to as MOD 113) for DSK modulation and a power amplifier 115 (hereinafter referred to as PA 115) while the second branch is formed by a MOD 114 for DSK modulation and a PA 116.

On the other hand, the receiving system in the base station is formed by two branches, namely, the first branch formed by a high-frequency amplifier (PFA) 121, a mixer (MIX) 123, an IF amplifier (IFA) 125 and a delay circuit 127 and the second branch formed by a high-frequency amplifier 122, a mixer 124 and an IF amplifier 126, a demodulator 128 (hereinafter referred to as the DEM 128) and an output terminal 129. The DEM 128 combines and demodulates the output signals from the two branches by a T/2 circuit.

The antenna system 13 of the base station is formed by diplexers 131 and 132 (hereinafter referred to as DUP-131 and 132), a horizontally polarized antenna 133 and a vertically polarized antenna 134.

The mobile station 20 is formed by a first antenna 21, a second antenna 22 orthogonally polarized to the first one, a hybrid circuit 23, a receiver 24,aa transmitter 25, a receiving output terminal 26 and a transmitting input terminal 27.

Description is now made on the operation of the digital communication system according to the present invention.

In the transmitting system 11 of the base station, a signal received in the data input terminal 111 is divided into two signals: one of which is transmitted through the delay circuit 112, the modulator 113, the power amplifier 115, the diplexer 131 and the horizontal polarization antenna 133.

The other signal is directly transmitted through the modulator 114, the power amplifier 116, the diplexer 132 and the vertically polarized antenna 134. The mobile station receives two signals having delay time difference produced by the DL (112) in the transmitting system (11).

Meanwhile, when the transmission rate is small, delay time difference in a space propagation path of the mobile radio communication system is remarkably small in comparison with the time slot width, and hence the delay time $\tau d$ of the DL (112) is set in such a manner that delay time difference required to obtain the best bit error rate in the DSK system is attained through the DL (112).

Assuming that, for example, the transmission rate is 6000 bauds and the delay time difference $\tau$ between the D and U waves is 10 $\mu$sec. as hereinabove described, the preferable value 1.0 to 0.3 of $(\tau+\tau d)/T$ is obtained as follows, since the value T is equal to 167 82 sec. as hereinabove described:

$(\tau+\tau d)/167$ $\mu$sec. = 0.1 to 0.3

$\tau+\tau d = 16.7$ to 50.1 ($\mu$sec.)

where
$\tau = 10$, and hence
$\tau = 6.7$ to 40.1 ($\mu$sec.)

Although the delay time difference $\tau$ between the D and U waves is 10 $\mu$sec. in the above description, the same may become zero and hence the value $\tau d$ is preferably larger than 16.7 $\mu$sec. so that the value $(\tau+\tau d)/T$ is larger than 0.1 even if the value $\tau$ is equal to zero.

The mobile station receives/detects the signals transmitted from the transmitter of the base station in the aforementioned manner, whereby a remarkably excellent bit error rate is obtained. On the other hand, the mobile station transmits the signals from one TX 25 through the crossed first and second antennas 21 and 22, to be received by the antenna system 13 of the base station. Signals transmitted from one transmitter (25) of the mobile station are received by the horizontally polarized antenna (133) and the vertically polarized antenna (134) of the antenna system (13) of the base station; conversion to an intermediate frequency is carried out by receiving circuits of two branches corresponding to the signals of the horizontal polarization and the vertical polarization; delay is produced only to the receiving circuit of the horizontal polarization by the DL (127); and then, composition is made to be applied to the DEM (128). The DL (127) is to be of a delay amount required to obtain the optimum bit error rate of the DSK system in a similar manner to the above description, and hence the data of the bit error rate is remarkably improved in the receiver system of the base station.

Figure 13:
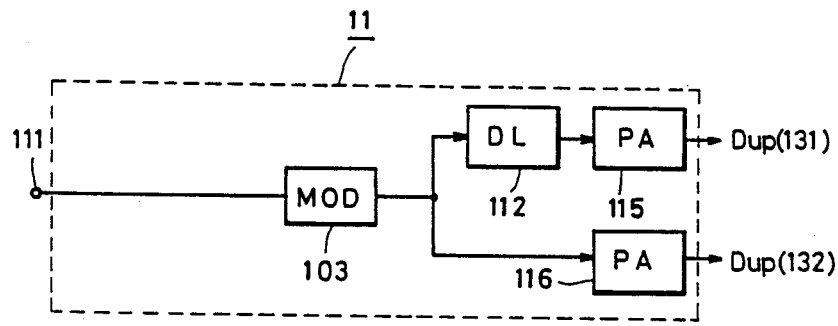
FIG. 13 is a block diagram showing another example of a delay system in the transmitting system according to the present invention.
Figure 14:
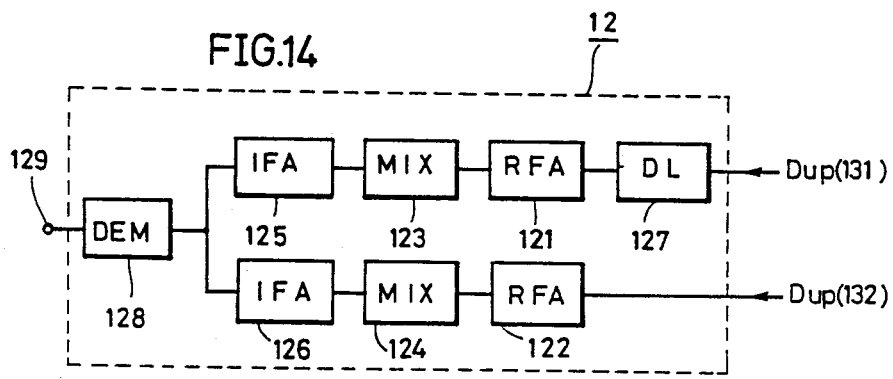
FIG. 14 is a block diagram showing another example of a delay insertion in the receiving system according to the present invention.

As it may be seen from the above description, the prescribed purpose is attained by differentially detecting the two DSK signals such as the horizontally polarized signal and the vertically polarized signal in the mobile radio communication system transmitted through propagation paths with no correlation (or extremely small correlation), delay time difference between which is set at a desired value (that is, the delay time which can effectuate the bit error rate improving characteristics of the DSK system), by the demodulator 128. Therefore, with respect to the location for inserting the delay circuit, it may be the system of the above embodiment (transmission area delay applying system), in which signals are divided into two before the DSK modulation, one of the signals is delayed to gain a desired delay time difference, both of the signals are transmitted to two transmission paths with no correlation after the DSK modulation (utilizing the horizontal polarization and the vertical polarization), the signals received from these two paths are composed at the receiving area for differential detection, or another system (receiving area delay applying system) in which a DSK signal is sent into two transmission paths with no relation, one of the signals received through the first transmission path and the second transmission path is delayed by a desired delay time difference to be composed for differential detecting. In addition, there are other modifications as follows:

As for the transmission area delay applying system, a DSK signal which is DSK-modulated by the MOD (103) may be divided into two and delayed by the delay time difference to be sent to transmission paths with no relation as shown in FIG. 13. As for the receiving area delay applying system, a DSK signal may be sent to two transmission paths with no correlation to apply desired delay time difference between each of the outputs of the two transmission paths with no correlation as shown in FIG. 14 to be composed for differential detection.

Although the delay circuits are provided only in the base station in the above described examples, the same may be inserted only in the mobile station, or separately inserted in the base station and the mobile station. Although the above description has been made on the case of employing the horizontally and vertically polarized signals as the transmission paths with no correlation, the present invention is also applicable to a system utilizing two antennas separated from each other (employing the so-called space diversity concept) and to a system utilizing two antennas different in antenna pattern from each other (employing the so-called antenna pattern diversity concept). Further, the present invention can be applied to a system employing two antennas in two or three combinations of the polarization, the deviation in position and the difference in antenna pattern, employing two or three combinations of the polarization, the space diversity and the antenna pattern diversity.

Further, although the above description has been made on the case where both of the base and mobile stations are provided with the horizontally and vertically polarized antennas, the polarization of wave is extremely disturbed by multipath reflection in the propagation paths of mobile radio communication, while correlation between horizontal and vertical polarization components thereof is extremely reduced. Namely, even if either the horizontal or vertical polarization component is lowered, the other polarization component is not lowered and hence the antennas of the mobile station may have only one type plane of polarization. The radio waves transmitted from the mobile station can be received by both the horizontal and vertical polarization antennas 133 and 134 of the antenna part of the base station as the signals having horizontal and vertical polarization components to be separated into the signals in the prescribed delay time through the two-system receiving circuits and then composed with each other, whereby the optimum operation characteristics are obtained in the DSK system. The respective signals can be transmitted in circular polarization to obtain a similar effect.

Although the aforementioned embodiment is applied to the DSK system in the above description, the present invention may also be applied to systems for improving the bit error rate with increased delay time difference, e.g., the BPSK-RZ system and the QPSK-RZ system.

Figure 2:
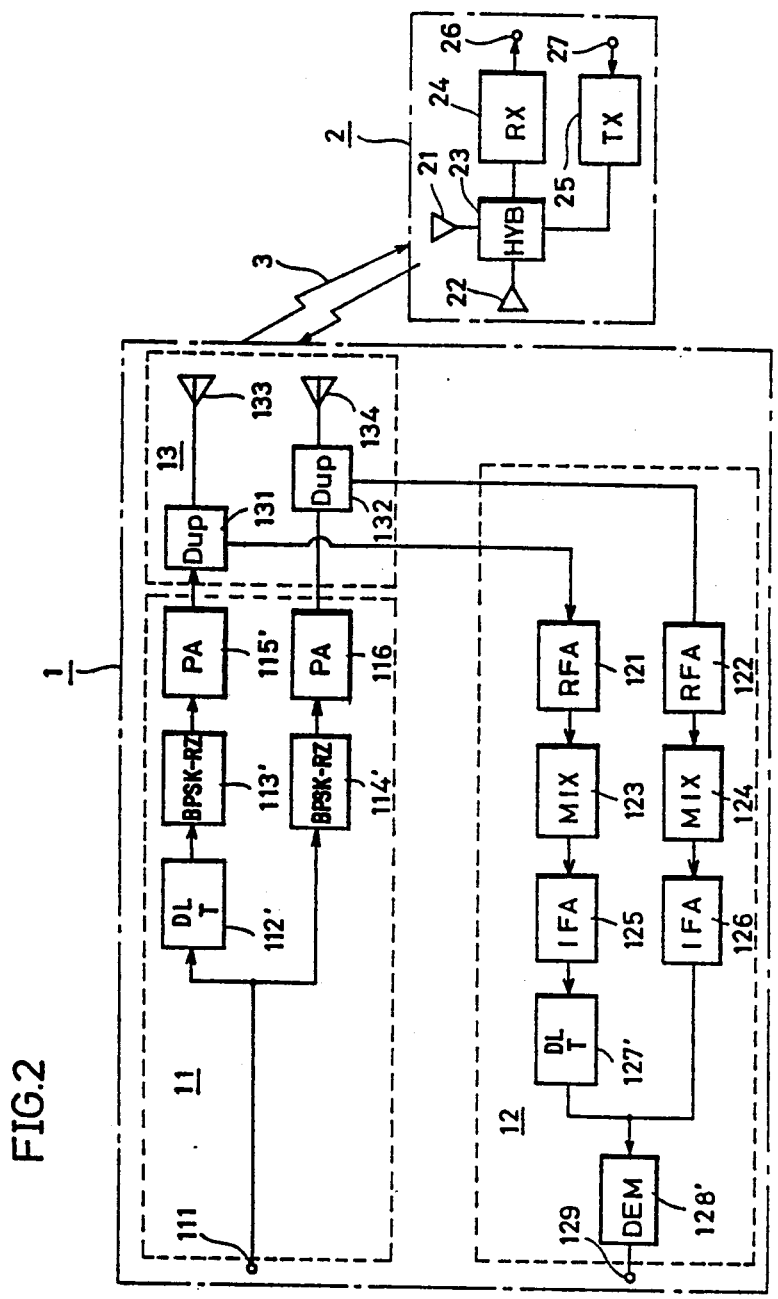
Figure 3A:
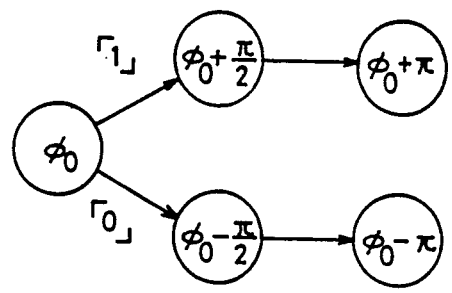
FIGS. 3(A) and 3(B) are diagrams describing the DSK system.
Figure 3B:
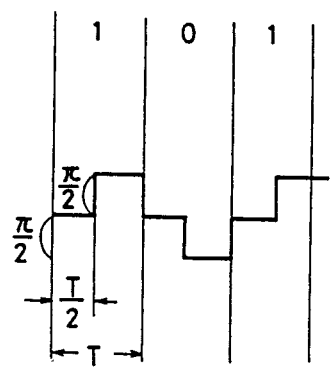
Figure 4:
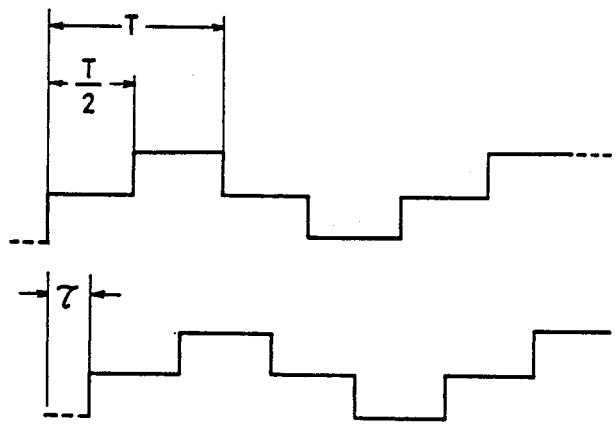
FIG. 4 is a diagram illustrating two signals with delay time difference.
Figure 5:
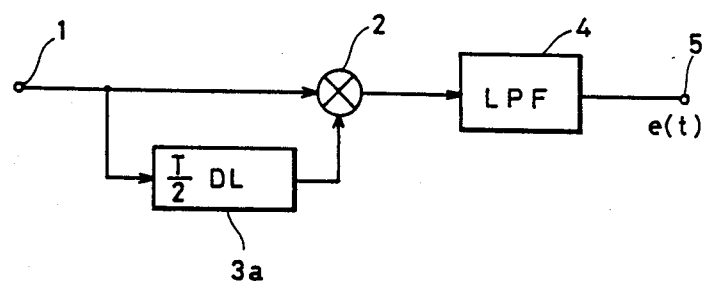
FIG. 5 is a diagram showing the structure of a demodulator in the DSK system.
Figure 6A:
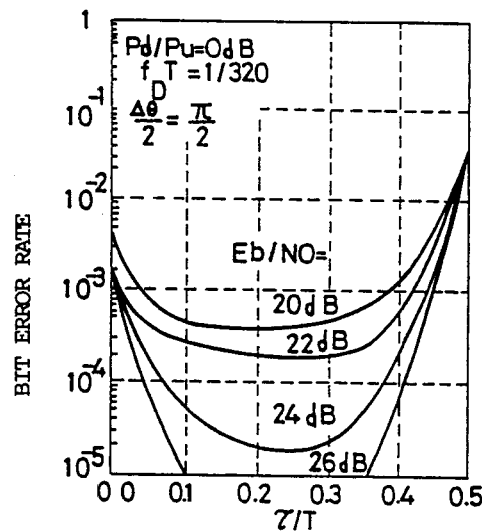
FIGS. 6(A) and 6(B) are characteristic diagrams showing a relation between the delay time difference and the bit error rate in the DSK system.
Figure 6B:
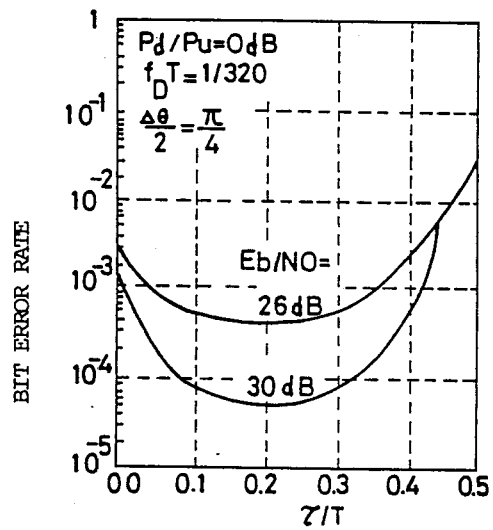
Figure 10:
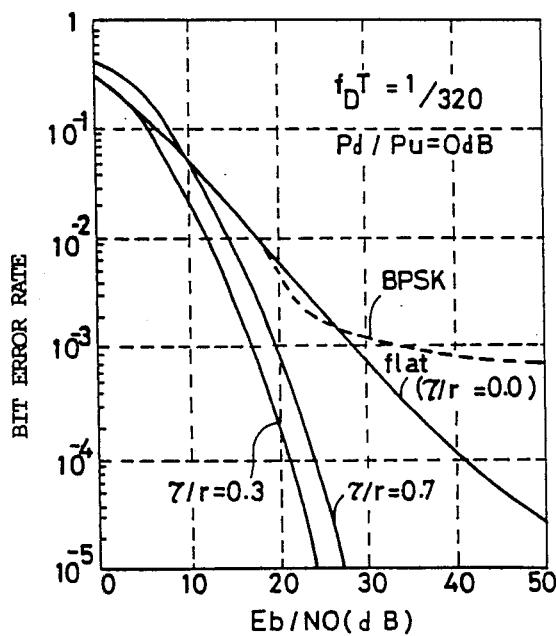
FIGS. 10(A) and 10(B) are characteristic diagrams showing a relation between the delay time difference and the bit error rate in the BPSK-RZ.
Figure 10B:
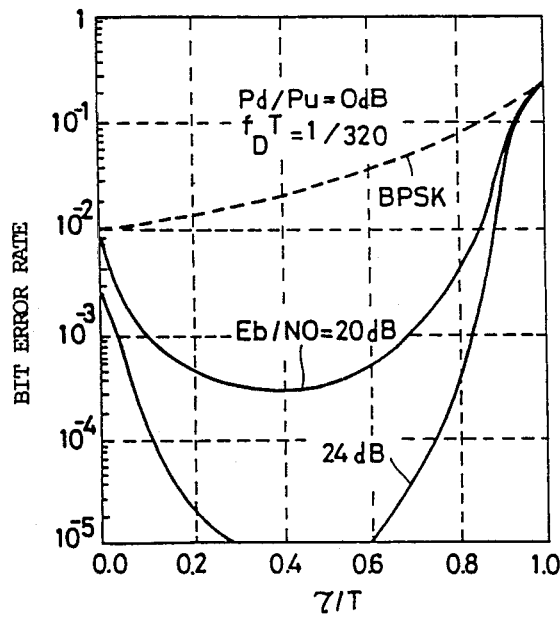
Figure 12A:
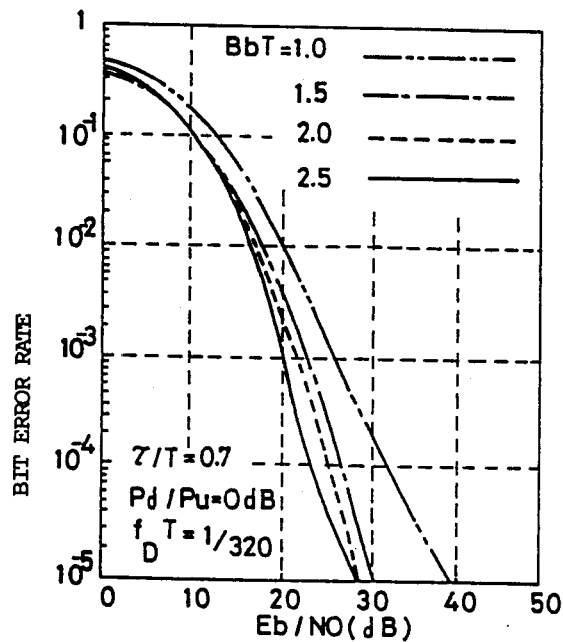
FIG. 12(A) and 12(B) are characteristic comparison diagrams in case of applying bans restriction through a base band filter.
Figure 12B:
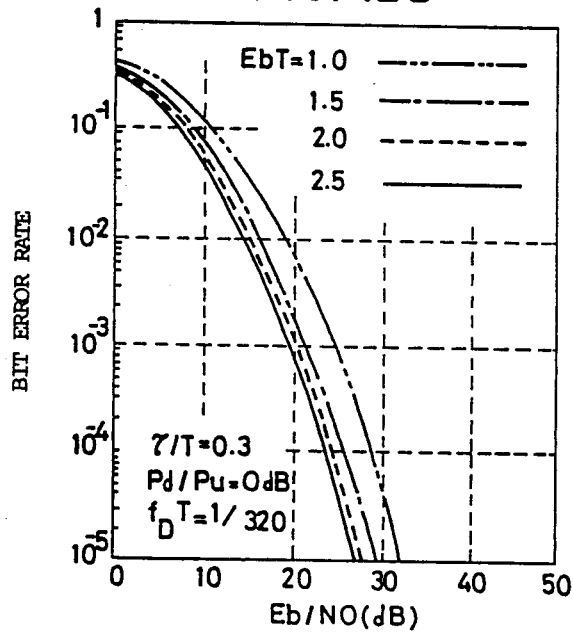

The case of the BPSK-RZ system will be described with reference to FIG. 2. The device as shown in FIG. 2 is identical in structure to that of the DSK system shown in FIG. 1, except for the following points: Although the MODs 113 and 114 as shown in FIG. 1 are adapted to perform DSK modulation, MODs 113' and 114' as shown in FIG. 2 are adapted to perform BPSK-RZ modulation. Further, while the DEM 128 as shown in FIG. 1 has the T/2 delay circuit, a DEM 128' as shown in FIG. 2 is implemented by a differential detector having a T delay circuit. In addition, while the delay circuits (DL) 112 and 127 as shown in FIG. 1 are selected to be in the delay time required to obtain the best bit error rate in the DSK system, delay circuits (DL) 112' and 127' as shown in FIG. 2 are selected to be of delay time required to obtain the best bit error rate in the BPSK-RZ system.

The embodiment as shown in FIG. 2 is identical in operation to that shown in FIG. 1, and description thereof is omitted.

Although the above description has been made on the case of applying the modulation system with the improving effect such as the DSK or BPSK-RZ system to both of the route from the transmitter of the base station to the mobile station and the route from the mobile station to the receiver of the base station, the system of the present invention can be applied to only one of the routes while employing another improving system for the other route.

In the digital communication system according to the present invention, the delay circuits are cascade-connected partially in the two signal transmission paths in order to ensure delay time difference required for improving the bit error rate of the DSK or BPSK-RZ signals transmitted through two transmission paths with no correlation or small correlation in transmission characteristics through use of the DSK or BPSK-RZ system as hereinabove described. Thus, even if the delay time in the space propagation paths is smaller than the delay time difference required for the prescribed improving operation by the DSK or BPSK-RZ system, prescribed delay time difference can be provided by the delay circuits to operate the communication system in the optimum operation point of the DSK or BPSK-RZ system.

POSSIBILITY OF INDUSTRIAL UTILIZATION

The present invention may be utilized in mobile radio communication system such as radio device for motor cars, or the like.

What is claimed is:

1. A digital communication system for transmitting to a receiving side digital signals comprising first and second predetermined information symbols digitized in a predetermined time slot generated from a signal source, comprising:

two signal transmission paths each having substantially different transmission time intervals between said signal source and an output of said receiving side, delay means inserted into at least one of said signal transmission paths for setting the delay time of information signals being transmitted via said two signal transmission paths at a predetermined fraction of said time slot, modulation means responsive to said digital signals for generating said information symbols by shifting carrier wave signal phases continuously twice by $\Delta\theta/2$ per ½ time slot with respect to first information symbols and continuously twice by $-\Delta\theta/2$ per ½ time slot with respect to second information symbols, and demodulation means for combining said information signals received via said two signal transmission paths and for demodulating the original digital signal by delay detection, whereby a bit error rate of said system is brought near a minimum relative to said predetermined time slot.

2. A digital communication system in accordance with claim 1, wherein said two paths are cross-polarized with each other.

3. A digital communication system in accordance with claim 1, wherein said two transmission paths are paths through two antennas deviating in position from each other.

4. A digital communication system in accordance with claim 1, wherein said two transmission paths are paths through two antennas different in antenna propagation pattern from each other.

5. A digital communication system in accordance with claim 1, wherein said two transmission paths are formed by two or three combinations of paths cross polarized with each other, paths through two antennas deviating in position from each other and paths through two antennas different in antenna propagation pattern from each other.

6. A digital communication system for exchanging between a base station and a mobile station digital signals comprising first and second predetermined information signals digitized in a predetermined time slot generating from a signal source, comprising:

two signal transmission paths each having substantially different delay time intervals between said base station and said mobile station, delay means inserted into at least one of said two signal transmission paths for setting the delay time of information signals being transmitted via said two signal transmission paths at a predetermined fraction of said time slot, modulation means responsive to said digital signals for generating said information signals by shifting carrier wave signal phases continuously twice by $\Delta\theta/2$ per ½ time slot with respect to first information symbols and continuously twice by $-\Delta\theta/2$ per ½ time slot with respect to second information symbols, and demodulation means for combining said information signals received via said two signal transmission paths and for demodulating the original digital signal be delay detection, whereby a bit error rate of said system is brought near a minimum relative to said predetermined time slot.

7. A digital communication system in accordance with claim 6, wherein two antennas comprise the transmission system and and said two antennas forming the receiving system are respectively formed by two antennas orthogonally polarized with each other.

8. A digital communication system in accordance with claim 7, wherein said two antennas forming the transmission system and said two antennas forming said receiving system are respectively formed by antennas having space diversity effects different in position from each other.

9. A digital communication system in accordance with claim 7, wherein said antennas forming said transmission system and said antennas forming said receiving system are respectively formed by antennas having different antenna propagation pattern diversity effectes.

10. A digital communication system in accordance with claim 7, wherein said antennas forming said transmission system and said antennas forming said receiving system are antennas aving diversity effects formed by a plurality of combinations of antennas having crossed polarization, antennas deviating in position from each other and antennas different in antenna pattern from each other.

11. A digital communication system in accordance with claim 7, wherein said antenna in said first signal transmission path in said transmission system is commonly employed with said antenna in said first signal transmission path in said receiving system.

12. A digital communication system for transmitting to a receiving side digital signals comprising predetermined first and second information symbols digitized in a predetermined time slot generated form a signal source, comprising:

two signal transmission paths each having substantially different transmission time intervals between said signal source and an output of said receiving side, delay means inserted into at least one of said signal transmission paths for setting the delay time of information signals being transmitted through said two signal transmission paths at a predetermined fraction of said time slot, modulation means responsive to said digital signals for generating information signals by shifting carrier wave signal phases twice by $\Delta\theta/2$ per ½ time slot based on a $\pi/2$ DSK system with respect to binary information symbols, and demodulation means for combining said information signals received via said two signal transmission paths and for demodulating the original digital signal by delay detection, whereby a bit error rate of said system is brought near a minimum relative to said predetermined time slot.

13. A digital communication system for transmitting to a receiving side digital signals comprising first and second predetermined information symbols digitized in a predetermined time slot generated from a signal source, comprising:

two signal transmission paths each having substantially different transmission time intervals between said signal source and an output of said receiving side, delay means inserted into at least one of said signal transmission paths for setting the delay time of information signals being transmitted via said two signal transmission paths at a predetermined fraction of said time slot, modulation means responsive to said digital signals for generating information signals by shifting carrier wave signal phases twice by $\pi/4$ based on a $\pi/4$ DSK system with respect to binary information symbols, and demodulation means for combining said information signals received through said two signal transmission paths and for demodulating the original digital signal by delay detection, whereby a bit error rate of said system is brought near a minimum relative to said predetermined time slot.

14. A digital communication system for transmitting to a receiving side digital signals comprising first and second predetermined information symbols digitized in a predetermined time slot generated from a signal source, comprising:

two signal transmission paths each having substantially different transmission time intervals between said signal source and an output of said receiving side, delay means inserted into at least one of said signal transmission paths for setting the delay time of information signals being transmitted through said two signal transmission paths at a predetermined fraction of said time slot, modulation means responsive to said digital signals for generating BPSK-RZ signals identical in amplitude and phase to BPSK signals in a first T/2 intervals of respective time slots T and effectively 0 in amplitude n a second T/2 intervals, with respect to binary information symbols, based on a BPSK-RZ system, and demodulation means for combining said informat ion signals received through said two signal transmission paths and for demodulating the original digital signal by delay detection, whereby a bit error rate of said system is brought near a minimum relative to said predetermined time slot.

15. A digital communication system for transmitting to a receiving side digital signals comprising first and second predetermined information symbols digitized in a predetermined time slot generated from a signal source, comprising:

two signal transmission paths each having substantially different transmission time intervals between said signal source and an output of said receiving side, delay means inserted into at least one of said signal transmission paths for setting the delay time of information signals being transmitted via said two signal transmission paths at a predetermined fraction of said time slot, modulation means responsive to said digital signals for generating QPSK-RZ signals identical in amplitude and phase to QPSK signals in first T/2 intervals of respective time slots T and effectively 0 in amplitude in second T/2 intervals, with respect to binary information symbols, based on a QPSK-RZ system, and demodulation means for combining information signals received through said two signal transmission paths and for demodulating the original digital signal by delay detection, whereby a bit error rate of said system is brought near a minimum relative to said predetermined time slot.

* * * * *